United States Patent [19]

Smith, Jr. et al.

[11] 4,297,575
[45] Oct. 27, 1981

[54] SIMULTANEOUS GAMMA RAY MEASUREMENT OF FORMATION BULK DENSITY AND CASING THICKNESS

[75] Inventors: Harry D. Smith, Jr.; Dan M. Arnold, both of Houston; Kenneth J. Smith, Rosenberg, all of Tex.

[73] Assignee: Halliburton Company, Duncan, Okla.

[21] Appl. No.: 66,125

[22] Filed: Aug. 13, 1979

[51] Int. Cl.$^3$ ............................................... G01V 5/00
[52] U.S. Cl. .................................. 250/265; 250/266; 250/269
[58] Field of Search ................ 250/264, 265, 269, 266

[56] References Cited

U.S. PATENT DOCUMENTS

| | | | |
|---|---|---|---|
| 3,521,063 | 7/1970 | Tittman | 250/264 |
| 3,864,569 | 2/1975 | Tittman | 250/264 |
| 4,047,027 | 9/1977 | Bateman et al. | 250/264 |
| 4,048,495 | 9/1977 | Ellis | 250/264 |

*Primary Examiner*—Davis L. Willis
*Attorney, Agent, or Firm*—John H. Tregoning; William J. Beard

[57] ABSTRACT

A method for simultaneously measuring the formation bulk density and the thickness of casing in a cased well borehole is disclosed. Low energy gamma rays are emitted into the casing and formation in a cased borehole. Two longitudinally spaced detectors detect gamma rays scattered back into the borehole by the casing and surrounding earth materials. The count rate signals from the two detectors are appropriately combined according to predetermined relationships to produce the formation bulk density and the casing thickness, which are recorded as a function of borehole depth.

15 Claims, 5 Drawing Figures

SIMULTANEOUS GAMMA RAY MEASUREMENT OF FORMATION BULK DENSITY AND CASING THICKNESS

BACKGROUND OF THE INVENTION

This invention relates to gamma ray scattering or gamma-gamma density well logging techniques and, more particularly, to such techniques for simultaneously deriving a compensated formation bulk density and a measurement of the thickness of casing in a cased well borehole.

Well workovers in relatively old wells in which casing has been set have become fairly routine in the maintenance of existing oil fields. In performing well workovers it is necessary when relogging the well to utilize nuclear measurement techniques which can measure formation characteristics through the casing in a cased well borehole. One such technique, which is being increasingly used, has been the gamma ray scattering or gamma-gamma density measurement of the formation bulk density as measured by the scattering characteristics for relatively low energy gamma radiation.

In gamma-gamma logging, a gamma ray source is utilized to irradiate formations through the casing. The scattered gamma rays impinging upon a pair of spaced gamma ray detectors produce count rate signals which may be interpreted in terms of the electron density or formation bulk density of the earth formations behind the casing. This measure of bulk density is used to determine many formation parameters of interest. As an example, bulk density along with the response of a neutron log can be used to identify gas saturated formations.

In working over or recompleting older existing wells, in which casing has been set, it is also very desirable to the well operator to be able to determine the condition of the casing. The gamma ray scattering measurement when processed according to the techniques of the present invention is capable of yielding information concerning the casing thickness simultaneously with the measurement of the formation bulk density. This casing thickness information may be utilized, for example, to locate casing collars in the wellbore or to indicate thin casing sections which could be a problem in the recompleted well after it goes onto production. By anticipating casing weakness ahead of time, corrective measures such as squeeze cementing may be taken to reinforce weakened casing sections.

BRIEF DESCRIPTION OF THE INVENTION

The present invention concerns a well logging system which is capable of simultaneous measurements of the formation bulk density behind casing in a cased wellbore and the casing thickness of the casing in the cased wellbore. A downhole well logging instrument or sonde is provided which contains a gamma ray source and two gamma ray detectors spaced longtudinally at different distances from the gamma ray source. Measurements of the count rate at each of the gamma ray detectors are made while passing the downhole logging instrument through a well borehole. By appropriately combining the count rates of the gamma rays scattered by the casing and earth formation materials into each of the two detectors according to predetermined relationships, measurements may be made of the earth formation compensated bulk density and the thickness of the casing in the vicinity of the gamma ray source and detectors. Simultaneous graphical plots or well logs of the formation bulk density, casing thickness and other parameters of interest are recorded as a function of borehole depth.

The invention may best be understood by reference to the following detailed description thereof when taken in conjunction with the accompanying drawings, in which:

DESCRIPTION OF THE PREFERRED EMBODIMENT

Before discussing the measurement systems of the present invention, it will be helpful to review briefly, the theory of gamma ray scattering or gamma-gamma density logging to more clearly illustrate the principle of the present invention.

Figure 1:
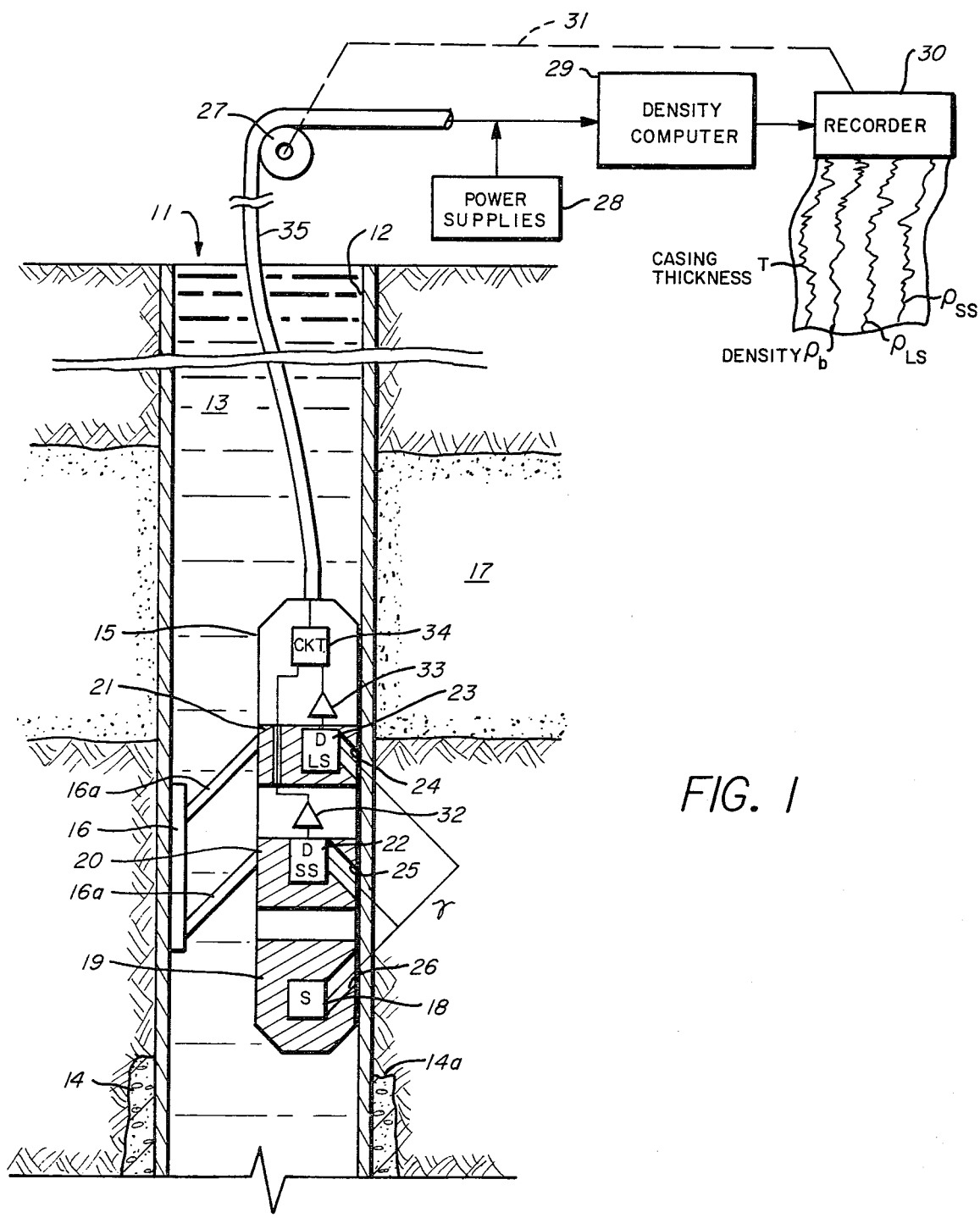
FIG. 1 is a schematic illustration showing a well logging system in accordance with the concepts of the present invention.

In gamma ray density logging, gamma rays are emitted from a source contained in a well tool lowered into the well borehole. The instrument is urged against the side of the borehole wall by a backup arm or tool eccentering device as illustrated in FIG. 1. The gamma rays emitted from the source penetrate through the tool case, borehole and into the formation including any casing surrounding the wellbore. A fraction of these gamma rays are scattered back into the tool and are detected and counted by one or more gamma ray detectors in the tool. The attenuation which the gamma rays undergo between the source and detector can, under certain conditions, be very simply related to the formation bulk density. Equation 1 relates the count rate C observed in a detector to the formulation bulk density $\rho_b$, for $\rho_b \gtrsim 0.5$ gm/cm$^3$.

$$C = I_o e^{-\mu_m X(SD)\rho_b} \quad (1)$$

In this expression, $I_O$ is a constant related to the strength and geometry of the gamma ray source, and the geometry and efficiency of the gamma ray detector(s), $\mu_m$ is the mass attenuation coefficient of the zone through which the detected gamma rays passed, X(SD) is a geometric factor related to the source detector paths across which the gamma rays must travel to be counted by the tool, and e is the Napierian logarithm base. Simply stated Equation 1 indicates that the count rate will decrease exponentially as the mass attenuation coefficient or density of the formation/borehole increases, and also as the source to detector spacing increases.

The variable $\mu_m$ is actually the sum of three terms corresponding to three processes with which gamma rays can interact with matter. The expression for $\mu_m$ is given by Equation 2.

$$\mu_m = \mu_{photo} + \mu_{pair} + \mu_{comp} \qquad (2)$$

The first term in Equation 2, $\mu_{photo}$, refers to gamma ray attenuation due to photoelectric absorption. In this process, the gamma ray is removed from the formation and its energy is given to an electron orbiting one of the formation nuclei. The second term, $\mu_{pair}$, refers to gamma ray attenuation due to pair production. In this process, the gamma ray is converted to an electron-positron pair and again, the gamma ray is completely removed from the medium. The third term, $\mu_{comp}$, relates to gamma ray attenuation due to Compton scattering. In this process the gamma ray is not removed, but loses energy and changes directions, as it scatters from the electrons of atoms comprising the earth formations.

Of these three processes, only Compton scattering is not highly dependent upon the specific elements in the medium. In fact $\mu_{comp}$ is about the same for all elements commonly found in the formation and borehole. On the other hand, $\mu_{pair}$ and $\mu_{photo}$ are strongly related to the atomic number Z of the nuclei in the earth formations and exhibit very strong gamma ray energy dependence.

If a density logging tool is designed to respond only to Compton scattered radiation, then the count rate C at a detector is given by the Equation 3.

$$C = I_0 e^{-X'\rho_e} \qquad (3)$$

where $\rho_e$ is the electron density of the medium and $X'$ is a constant. The electron density $\rho_e$ is related to the formation bulk density $\rho_b$ through Equation 4 for compound materials.

$$\rho_e = 2\rho_b \frac{\Sigma_i Z_i}{M} \qquad (4)$$

In Equation 4, $\Sigma_i Z_i$ is the sum of the atomic number of all the atoms making upon the molecules in the compound, and M is the molecular weight of the compound. For materials containing more than one compound, $\rho_e = \Sigma_j v_j \rho_{e,j}$ where $\rho_{e,j}$ is the electron density of the jth compound and $v_j$ is the volume fraction of the jth compound. For most materials found in earth formations.

$$2\frac{\{\Sigma_i Z_i\}}{M} \approx 1 \qquad (5)$$

Therefore, the count rate in most formations is related to the bulk density of the formation $\rho_b$ as given in Equation 6.

$$C \approx I_0 e^{31a\rho_b} \qquad (6)$$

where $a$ is a constant.

If the measured gamma ray energies include a range affected by either pair production or photoelectric attenuation, then the count rates will be lower in the detectors than that predicted by Equation 6. The amount of count rate reduction will be dependent on the type and concentration of elements present in the formation and borehole vicinity. For these reasons, it is desirable in a conventional density log to try to eliminate pair production and photoelectric effects from the log measurements.

Pair production cannot take place if the gamma ray energy $E_\gamma$ is less than 1.02 MEV. Accordingly, most well logging density tools are designed to use gamma ray sources having an initial energy less than 1.02 MEV. A typical such source is cesium 137 having an initial gamma ray energy $E_\gamma$ of 0.66 MEV. Photoelectric attenuation on the other hand is predominant at low gamma ray energies, occurring with a probability approximately proportional to $Z^4/E^3$. To reduce photoelectric effects, collimators designed to strongly attenuate low energy scattered gamma rays are placed around the detectors. In addition, detector threshold discriminators may be used to prevent low energy gamma rays from being counted. The gamma ray density tool then measures gamma radiation above a cut off energy such that for most elements encountered in a well borehole environment the term $\mu_{photo}$ is small. This minimizes photoelectric absorption as a source of density log error. In certain well borehole fluids such as those containing barium or barite muds, the barium has a sufficiently high Z so that this term affects the recorded count rate.

A dense medium close to a detector, such as iron casing, can likewise influence the measurement made by the detector. If a dense iron casing is closer to the detector than the formation, even though it be relatively thin, its proximity can cause it to influence the count rate more than the thicker formation located further away. The mass attenuation coefficient $\mu_m$ in Equation 1 is therefore larger than expected because of an appreciable increase in Compton scattering. This results in the detector counting rates being normally lowered from the simple case of direct formation contact of the tool. However, the use of a second spaced gamma ray detector can be applied in such instances to correct or compensate for this.

It will be recalled, that the count rate in a single detector is given by the relationship of Equation 6. Taking the logarithm of both sides of Equation 6 yields Equation 7.

$$\log(C) = A - B\rho_b \qquad (7)$$

Figure 4:
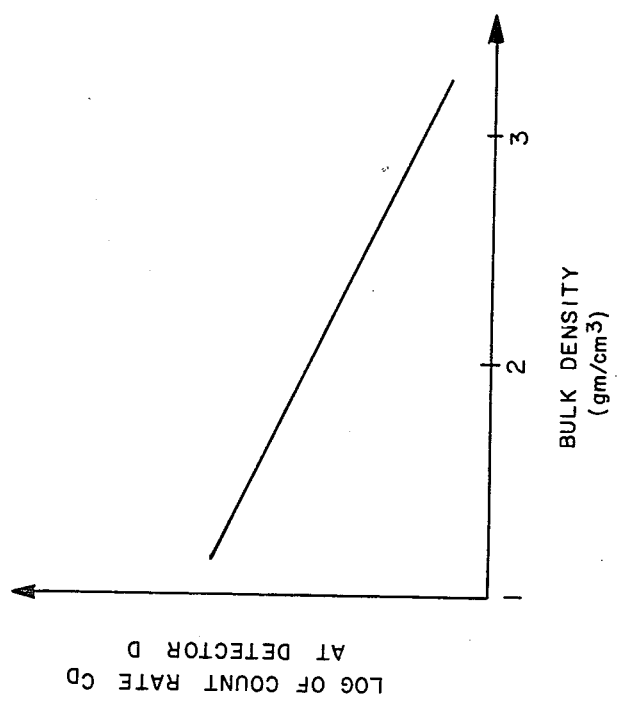
FIG. 4 is a graphical illustration, showing the relationship of the logarithm of the count rate at a detector in a gamma ray density tool as a function of the formation bulk density.

This relationship where A and B are constants is illustrated graphically in FIG. 4. A single detector density tool however can only give accurate results for formation bulk density $\rho_b$ if there is no mud cake, casing or any other type of intervening material between the formation and the side of the instrument. The presence of mud cake or casing having a different density from that of the formation can distort the measurement. This is due to the fact that some of the gamma rays from the source will reach the detector through the mud cake or casing and some through the formation. The fraction which come through the mud cake or casing will be a function of the mud cake or casing thickness and density. The result is that the detector will "see" an apparent density intermediate between that of the mud cake or cassing and the formation. To correct or compensate for this error, a second detector is used in the gamma ray density system of the present invention. This is illustrated in the system of FIG. 1.

Figure 5:
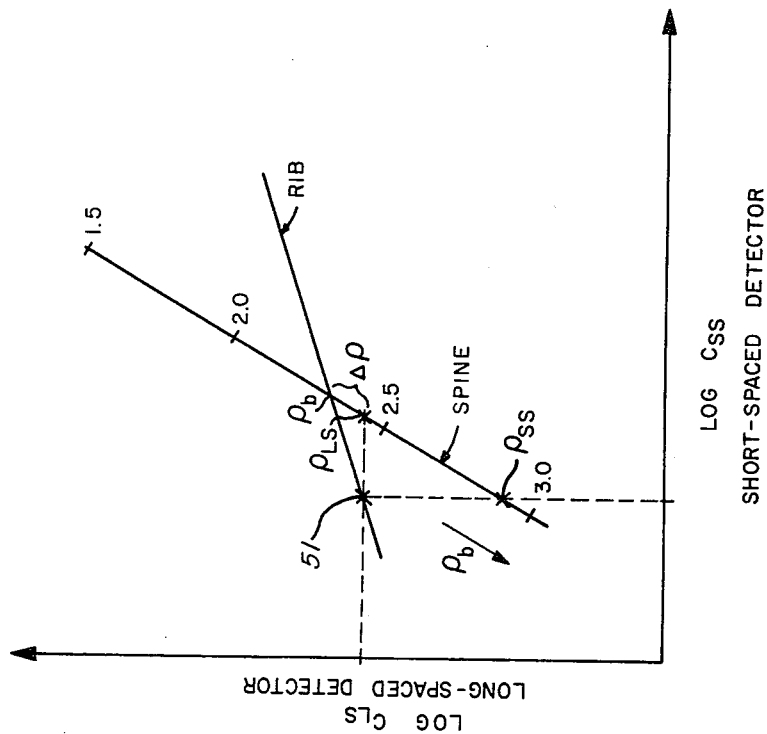
FIG. 5 is a graphical illustration, showing the formation bulk density of earth formations in the vicinity of a well borehole as a function of the logarithm of the counting rate at short spaced and long spaced detectors.

If the count rate in the short spaced detector of such an instrument is plotted versus the count rate in in the long spaced detector where no mud cake or casing is present between the detectors and the earth formations a line labelled as a "spine" in FIG. 5 is obtained. The density line labelled spine in FIG. 5 has the property that the count rate in either detector will uniquely determine the formation bulk density. If a mud cake or casing thickness is interposed however between the formation and the detectors the countrates in both detectors will change. The mud cake or casing will occupy a larger percentage of the volume sensed by the short spaced detector than that sensed by long spaced detector. The short spaced detector count rate will change more than the long spaced detector count rate. This will cause the short spaced detector to indicate an apparent formation density $\rho_{ss}$ which is different from the density $\rho_{ls}$ indicated by long spaced detector. The difference between these two apparent densities is directly proportional to the amount of correction, $\Delta \rho$ which must be applied to the long spaced density $\rho_{ls}$ to obtain formation bulk density $\rho_b$ which is compensated for the intervening material. This may be expressed mathematically by the relationship of Equation 8.

$$\rho_b = \rho_{ls} + \Delta \rho \quad (8)$$

where $\Delta \rho = K(\rho_{ls} - \rho_{ss})$, K being a constant. Note that if both detectors indicate the same density, no correction $\Delta \rho$ is required. In this case, both detectors are "seeing" the same material. This will be the case with negligible thickness of mud cake in the borehole or without casing. As the mud cake or casing thickness is increased or the casing thickness is increased the absolute value of $\Delta \rho$ gets larger. A denser medium than the formation near the short spaced detector will cause a negative $\Delta \rho$ while a less dense medium nearer the short spaced detector will cause a positive $\Delta \rho$.

The solution of Equation 8 where $\rho_{ls}$ and $\rho_{ss}$ are related to count rates by equations similar to that of Equation 7, is calculated in a surface density computer 29 of FIG. 1 in the present invention. In addition, a compensated formation density $\rho_b$ log is calculated using the computed values $\rho_{ls}, \rho_{ss}$, and Equation (8).

A hypothetical example of data with casing interposed between the detectors and the earth formations as illustrated in FIG. 5, where the density of the intervening material is greater than that of the formation. Long spaced detector count rate $C_{ls}$ and short spaced detector count rate $C_{ss}$ corresponding to a point 51 of FIG. 5 are measured by the instrument. This point falls on a line labelled "rib" in FIG. 5. It will be observed that an apparently higher density $\rho_{ss}$ fror the short spaced detector count rate is indicated relative to that labelled $\rho_{ls}$ as derived from the count rate in the long spaced detector. This is due to the interposition of the standoff of the detectors from the formation caused by casing with density greater that of the formation. However, when the instrument has been calibrated in known formations with different casing and mud cake thickness, the rib line of FIG. 5 is defined. If the thickness of the intervening material is small with respect to the depth of the investigation of the tool and/or if the density of the intervening material is relatively close to the density of the formation, the rib will be a straight line as assumed in Equation (8). Under these conditions $\rho_b$ log computed from Equation (8) is equal to the true formation bulk density $\rho_b$ true and can be observed graphically as the intersection of the rib line with the spine line in FIG. 5. Each density point along the spine will have its own rib and, if the previous restriction on the intervening materials are met, all of these ribs are straight lines and are parallel. The $\Delta \rho_{log}$ correction measured along the spine is also indicated in FIG. 5. Steel casing whose thickness T is greater than 0.20 inches is usually sufficiently thick and dense to cause the ribs to become curved rather than straight lines. Under these conditions $\rho_b$log computed from $\rho_{ls}$, and Equation (8) will not equal the true formation bulk density $\rho_b$ true. Still, by appropriately calibrating a well logging instrument according to the concepts of the present invention in known formations and with known muds and casings, spine and rib plots similar to that of FIG. 5 may be generated for a variety of conditions. These data along with other data relating casing thickness to the $\Delta \rho$ correction (as illustrated in FIG. 3) may be entered into the surface computer 29 to determine true compensated formation density $\rho_b$ true and casing thickness T in accordance with the concepts of the present invention.

Figure 2:
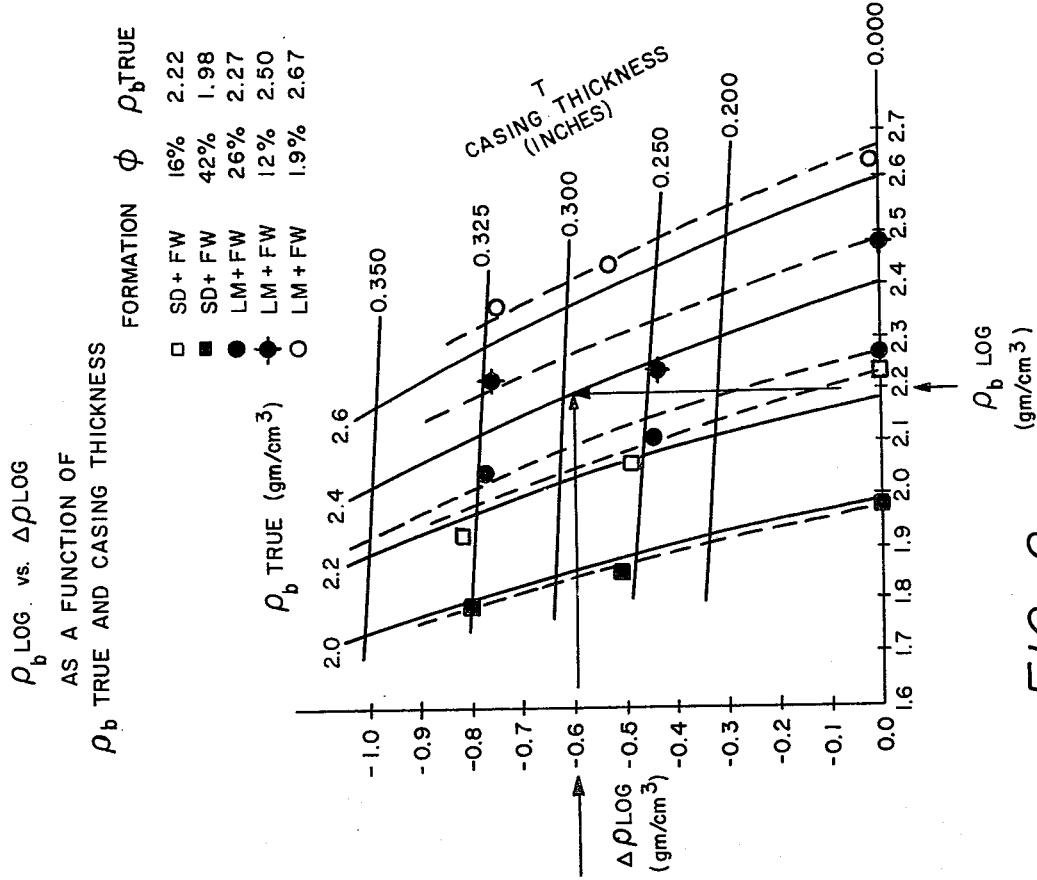
FIG. 2 is a graphical illustration, relating the measured formation bulk density and density correction as a function of the true formation bulk density and the thickness of casing in a well borehole.

Referring now to FIG. 2, a graphical plot of $\Delta \rho$ versus $\rho_b$log for various casing thicknesses, T in formations of bulk density $\rho_b$ true is illustrated. It is apparent from an observation of FIG. 2 that both $\rho_b$ and T may be determined uniquely from the log quantities $\Delta \rho$log and $\rho_b$log computed from measured count rates. As an example, a point is plotted on the graph of FIG. 2 and labelled "example". In this example, $\rho_b$log measured by the instrument equals 2.20 grams/centimeter$^3$. $\Delta \rho_{log}$ equals 0.60 grams/centimeter$^3$. This results in from the data plotted in FIG. 2, a casing thickness T, equal 0.295 inches and a formation bulk density $\rho_b$ true equal 2.40 grams/centimeter$_3$.

Figure 3:
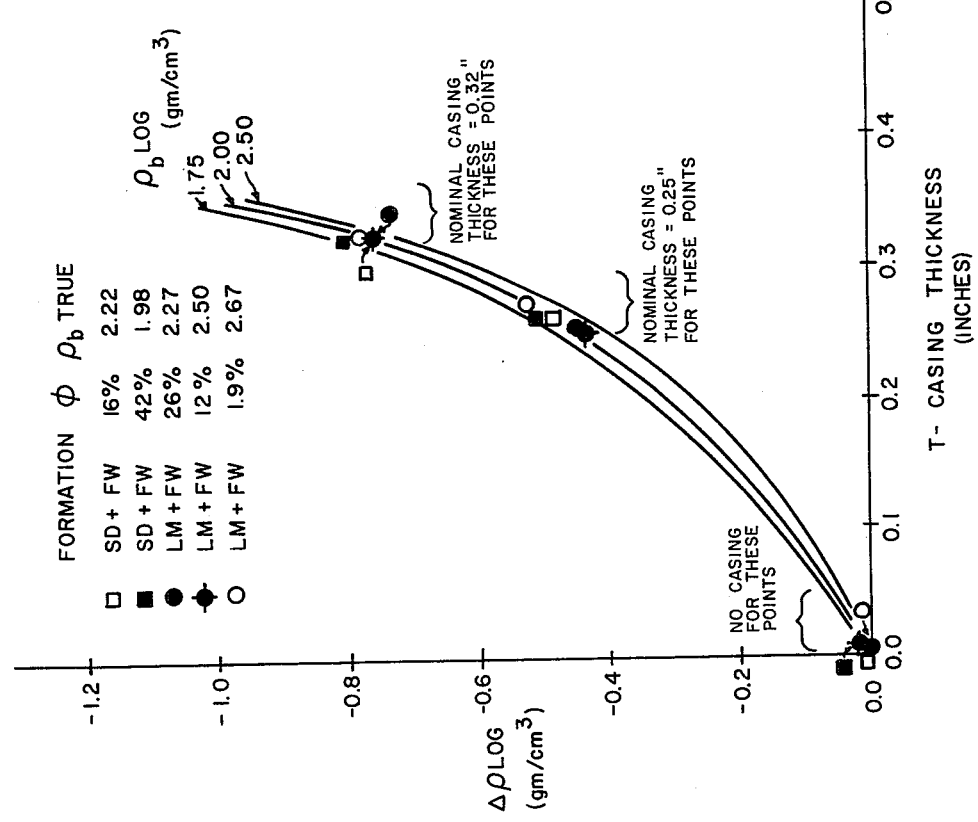
FIG. 3 is a graphical illustration, relating casing thickness in a cased well borehole as a function of the differential density correction in a compensated density measurement tool for various values of formation bulk density.

FIG. 3 illustrates a graphical relationship showing casing thickness T as a function of the measured quantity $\Delta \rho_{log}$ for various measured formation bulk densities $\rho_b$log. It may be seen from FIG. 3 that the casing thickness T is a strong function of $\Delta \rho_{log}$ and is affected only slightly by the measured bulk density $\rho_b$log. The data points of FIG. 3 were measured in calibrated cased and uncased formations as specified in the drawing.

Referring now to FIG. 1, a well logging system in accordance with the concepts of the present invention is illustrated schematically. A well borehole 11 is lined with steel casing 12 and filled with a borehole fluid 13. The borehole 11 penetrates earth formations 17 and near the lower portion thereof shown in the drawing of FIG. 1 is cemented in place by a cement sheath 14 which stops at a cement top 14a. The well logging instrument 15 is suspended via well logging cable 35 of the conventional armored type used in the art.

Above the cement top 14a, a well logging sonde 15 of fluid tight, hollow design is urged against the casing 12 by a backup pad or skid 16, which is supported by pad support arms 16a. The fluid tight, hollow body member or sonde contains near the lower end thereof, a gamma ray source 18 which, as hereinbefore stated, may comprise a source such as cesium 137 which emits primarily 0.66 MEV gamma rays. The gamma ray source 18 is surrounded by a gamma ray shielding material 19 having a channel or collimator 26 therein for emitting gamma rays into the formation as shown schematically in FIG. 1. Longitudinally spaced from the gamma ray source 18, is a first short spaced gamma ray detector 22. Detector 22 is surrounded by gamma ray shielding material 20 and has a collimation port or slot 25 cut therein for allowing gamma rays to enter in the manner illustrated in FIG. 1. The gamma ray detector 22 may comprise a Geiger-Muller tube or a scintillation type detector comprising a thallium activated sodium or cesium iodide crystal optically coupled to a photomultiplier tube. Impingement upon detector 22 of gamma rays scattered from the earth formation 17 causes voltage pulsed to be generated by the detector which are amplified by amplifier 32 and conducted to a cable driver circuit 34 for transmission to the surface of the earth via conductors of well logging cable 35. Similarly, a second longitudinally spaced gamma ray detector 23 is spaced at a longer distance from the gamma ray source 18 and is surrounding by gamma ray shielding material 21 having a collimation port 24 machined therein. The gamma ray shielding material 19, 20 and 21, may comprise for example, lead or tungsten or a combination thereof. Such materials are relatively opaque to the transmission of gamma rays.

The long spaced detector 23 may also comprise for example, a thallium activated sodium or cesium iodide scintillation crystal optically coupled to a photomultiplier tube. A gamma ray impinging upon detector 23 produces a voltage pulse which is conducted to an amplifier 33 and thence to cable driver circuit 34 for transmission to the surface of the earth via cable conductor of well logging cable 35.

The downhole well logging instrument or sonde 15 is suspended in the borehole 11 by well logging cable 35 which passes over a sheave wheel 27 located at the surface of the of the earth. Revolution of the sheave wheel 27 is electrically or mechanically coupled to a well logging recorder 30 as indicated by the dotted line 31. This enables measurements made by the downhole instrument to be recorded as a function of borehole depth.

At the surface a power supply 28, supplies energy for the operation of the downhole instrument via conductors of the well logging cable 35. It will be understood by those skilled in the art, that while not shown explicitly, the downhole instrument 15 contains appropriate power supplies for converting power supplied by surface power supply 28 to appropriate voltages for operating the detectors and cable driving circuitry in the downhole sonde.

Signals from the two downhole detectors which are transmitted to the surface by cable driver circuit 34 may be distinguished from each other, for example, by having opposite polarities. For example, the short spaced detector signals may comprise voltage pulses which may have a positive polarity when transmitted via well logging cable 35 to the surface. Those from the far detector 23 may comprise negative polarity voltages pulses which are transmitted to the surface via well logging cable 35. In this manner, the signals from the two different longitudinally spaced detectors 22 and 23 may be distinguished from each other at the surface by the density computer 29.

At the surface, density computer 29 receives the signals of scattered gamma rays transmitted from the downhole instrument 15 and separates them into the count rate signals from the short spaced and long spaced detectors. The compensated formation density computation is performed by the density computer 29 which has stored in the memory portion thereof, calibration information analogous to that illustrated in FIGS. 2, 4 and 5.

The density computer 29 may comprise for example, a small general purpose digital computer such as the model PDP-11 constructed by the Digital Equipment Corporation of Cambridge, Mass. The computer 29 may be properly programmed in a suitable high level compiler language, such as Fortran, or in an assembly language to perform the table look up, interpolation and extrapolation techniques described previously in order to derive the true formation bulk density $\rho_b$ true computed from the count rate information supplied by the two downhole detectors 22 and 23. Similarly, the computer 29 is programmed according to the relationships shown in FIGS. 2 or 3 to determine in addition to the compensated formation bulk density, the thickness T of casing 12 and the point at which the downhole instrument 15 is making a measurement. These various density measurements i.e., $\Delta\rho_{log}$, the compensated formation density $\rho_b$ true and the casing thickness T are supplied from computer 29 to well logging recorder 30, where they are recorded on a record medium as a function of borehole depth as illustrated schematically in FIG. 1.

To summarize the operation of the present invention, a well logging instrument having a source of gamma rays and two gamma ray detectors is lowered into a well borehole. The instrument is urged against a wall of the borehole by a backup arm or skid to provide intimate contact with the surface of the interior of a casing. Gamma rays emitted by the source are detected at a first short spaced detector and signals representative of the detected gamma rays at the short spaced detector are transmitted to the surface. Gamma rays are further detected by a second longitudinally spaced long spaced detector and signals representative of the count rate at the long spaced detector are also transmitted to the surface. At the surface a density computer separates the signals from the two detectors and, using first predetermined relationships, computes the uncorrected formation bulk density indicated by the count rate measurements at each of the two separate detectors. These data are then combined in a second predetermined relationship to provide a compensated formation density measurement which is compensated for the standoff caused by the casing from the earth formation surrounding the well borehole. Thus, a borehole compensated formation density measurement is provided. Similarly, using a third predetermined relationship, the count rates from the two detectors are combined and interpreted in terms of the thickness of the casing in the vicinity of the instrument when the measurement is made. Simultaneous logs of the borehole compensated formation bulk density $\rho_b$ true and the casing thickness T and the density correction $\Delta\rho_{log}$ are provided as a function of borehole depth.

The foregoing disclosure may make other alternative embodiments of the present invention apparent to those skilled in the art. It is therefore the aim of the appended claims to cover any and all such changes and modifications as fall within the true spirit and scope of the invention.

We claim:

1. A method for logging a cased well borehole to determine simultaneously the bulk density of earth formations behind the wall casing and the thickness of the well casing, comprising the steps of:

emitting low energy gamma radiation from a source of such radiation in a well borehole into the casing and earth formations surrounding a cased well borehole;

detecting at a first, longitudinally spaced distance from said source, gamma radiation scattered back into the borehole by the casing and earth formations and generating first count rate signals representative thereof;

detecting at a second, differently longitudinally spaced distance from said source, gamma radiation scattered back into the borehole by the casing and earth formations and generating secound count rate signals representative thereof;

combining said first and second count rate signals according to a predetermined relationship to derive a third signal representative of the earth formation bulk density compensated for detector standoff from the earth formation caused by the casing and a fourth correction signal representing the correction required to compensate said third signal for the standoff;

combining said third and fourth signals according to a second, different predetermined relationship, to derive a fifth signal representative of the thickness of the casing in the vicinity of said detectors; and recording at least said third and fifth signals.

2. A method of claim 1 wherein said steps are performed repetitively as said source and said detectors are moved through a cased well borehole and said recorded signals are recorded as function of borehole depth.

3. The method of claim 1 wherein said gamma ray source comprises a cesium 137 source which emits approximately 0.66 MEV gamma rays predominantly.

4. The method of claim 1 wherein at least one of said gamma ray detectors comprises a Geiger-Muller tube.

5. The method of claim 1 wherein at least one of said detectors comprises a thallium activated sodium iodide scintillation detector.

6. The method of claim 1 wherein said first predetermined relationship comprises an empirically derived relationship relating said first and second count rate signals to formation bulk density in a cased well borehole.

7. The method of claim 1 wherein said second predetermined relationship comprises an empirically derived relationship relating said correction signal and said formation bulk density signal to the thickness of said casing.

8. The method of claim 1 wherein said emitting and detecting steps are performed with said source and said detectors urged against the borehole wall.

9. A method for simultaneously measuring formation bulk density and casing thickness in a cased well borehole comprising the steps of:

irradiating earth formations in the vicinity of a cased well borehole with gamma radiation from a continuous gamma ray source disposed in the borehole;

detecting at first and second longitudinally spaced distances in the borehole from said source, gamma rays scattered back into the borehole by earth formations and casing and generating first and second detector signals representative thereof;

combining said detector signals according to a predetermined empirical relationship to derive a corrected formation bulk density signal and a standoff correction signal; and combining said detector signals according to a second predetermined empirical relationship to derive a signal indicative of the thickness of the casing in the cased well borehole.

10. The method of claim 9 and further including repeating the steps at different depth levels in a well borehole and recording at least two of said signals as a function of borehole depth.

11. The method of claim 9 wherein the irradiating step is performed with a relatively low energy gamma ray source to avoid pair production.

12. The method of claim 11 wherein said source comprises a cesium 137 source.

13. The method of claim 9 wherein said detecting steps are performed with at least one Geiger-Muller tube detector.

14. The method of claim 9 wherein said detecting steps are performed with at least one sodium iodide thallium activated scintillation detector.

15. The method of claim 9 wherein said empirical relationships are derived by calibrating said source and detectors configuration in cased boreholes having known properties prior to making said measurements.

* * * * *